US012718269B2

(12) United States Patent
Xia

(10) Patent No.: US 12,718,269 B2
(45) Date of Patent: Aug. 25, 2026

(54) OUTGOING COMMUNICATION PLANNER UTILIZING MACHINE LEARNING

(71) Applicant: Faire Wholesale, Inc., San Francisco, CA (US)

(72) Inventor: Jing Xia, South Pasadena, CA (US)

(73) Assignee: Faire Wholesale, Inc., San Francisco, CA (US)

( * ) Notice: Subject to any disclaimer, the term of this patent is extended or adjusted under 35 U.S.C. 154(b) by 43 days.

(21) Appl. No.: 18/748,536

(22) Filed: Jun. 20, 2024

(65) Prior Publication Data

US 2025/0390908 A1 Dec. 25, 2025

(51) Int. Cl.
*G06Q 30/0251* (2023.01)
*G06Q 30/0242* (2023.01)
*G06Q 30/0272* (2023.01)
*G06Q 30/0601* (2023.01)

(52) U.S. Cl.
CPC ..... *G06Q 30/0264* (2013.01); *G06Q 30/0242* (2013.01); *G06Q 30/0244* (2013.01); *G06Q 30/0254* (2013.01); *G06Q 30/0255* (2013.01); *G06Q 30/0272* (2013.01); *G06Q 30/0601* (2013.01)

(58) Field of Classification Search
CPC ........... G06Q 30/0244; G06Q 30/0242; G06Q 30/0254; G06Q 30/0264; G06Q 30/0272
See application file for complete search history.

(56) References Cited

U.S. PATENT DOCUMENTS

| | | | | |
|---|---|---|---|---|
| 9,959,551 | B1 | 5/2018 | Schermerhorn et al. | |
| 11,756,105 | B2 * | 9/2023 | Luk | G06Q 30/0635 705/26.82 |
| 12,380,467 | B2 * | 8/2025 | Schmeling | G06Q 30/0253 |
| 2021/0357952 | A1 * | 11/2021 | Liu | G06Q 10/107 |
| 2022/0222710 | A1 * | 7/2022 | Sun | H04L 51/214 |
| 2022/0230242 | A1 * | 7/2022 | Koziol | G06Q 40/04 |

(Continued)

OTHER PUBLICATIONS

Predicting the Optimal Date and Time to Send Personalized Marketing Messages to Repeat Buyers. Alexandros Deligiannis, Charalampos Argyriou, Dimitrios Kourtesis. (IJACSA) International Journal of Advanced Computer Science and Applications, vol. 11, No. 4, 2020 (Year: 2020).*

(Continued)

*Primary Examiner* — Michael Misiaszek
(74) *Attorney, Agent, or Firm* — Pearl Cohen LLP

(57) ABSTRACT

Computer implemented methods and systems for controlling sending of messages to retailers utilizing a B2B marketplace platform are described herein. Machine learning is used to train a communications timing model and a retailer interest model based on past messages sent to and received by each retailer of a plurality of retailers. The trained communications timing model is used to determine, for each retailer, a preferred timing for the retailer receiving messages from the B2B marketplace. The trained retailer interest model is used to determine, for each retailer, a respective level of interest for each of a plurality of different message types that may be sent to the retailer by the B2B marketplace. A decision engine schedules and controls sending of the messages to each retailer based on outputs of the communications timing model and the retailer interest model.

16 Claims, 10 Drawing Sheets

(56) References Cited

U.S. PATENT DOCUMENTS

| | | | | |
|---|---|---|---|---|
| 2022/0245446 | A1* | 8/2022 | Mitra | G06N 3/08 |
| 2025/0326407 | A1* | 10/2025 | Vukovic | B60W 60/0025 |

OTHER PUBLICATIONS

International Search Report & The Written Opinion of the International Searching Authority dated Oct. 8, 2025, 1 International Application No. PCT/US2025/032754.

* cited by examiner

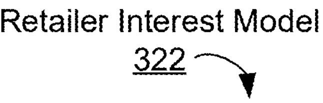

FIG. 6A

Determining interests of retailers by identifying the type of past messages read by the retailers (600)

↓

Providing a ranking of messages grouped in a communication lane for a best match to a retailer based on the retailer interest model for use in eliminating some messages from transmission based on the ranking. (602)

Retailer Interest Model
322

FIG. 6B

Determining information for a retailer interest model based on retailer activity feedback from messages sent out including: (604)

- Received messages;
- Opened messages in the received messages;
- Messages opened resulting in an order; and
- Unsubscribing resulting from received messages

↓

Storing metadata for with each previously sent message that is fed back to the retailer interest model indicating: (606)

- Whether the message is transactional or marketing
- Whether there is an incentive offered in the message
- Whether the message is time sensitive

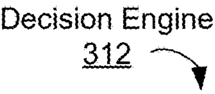
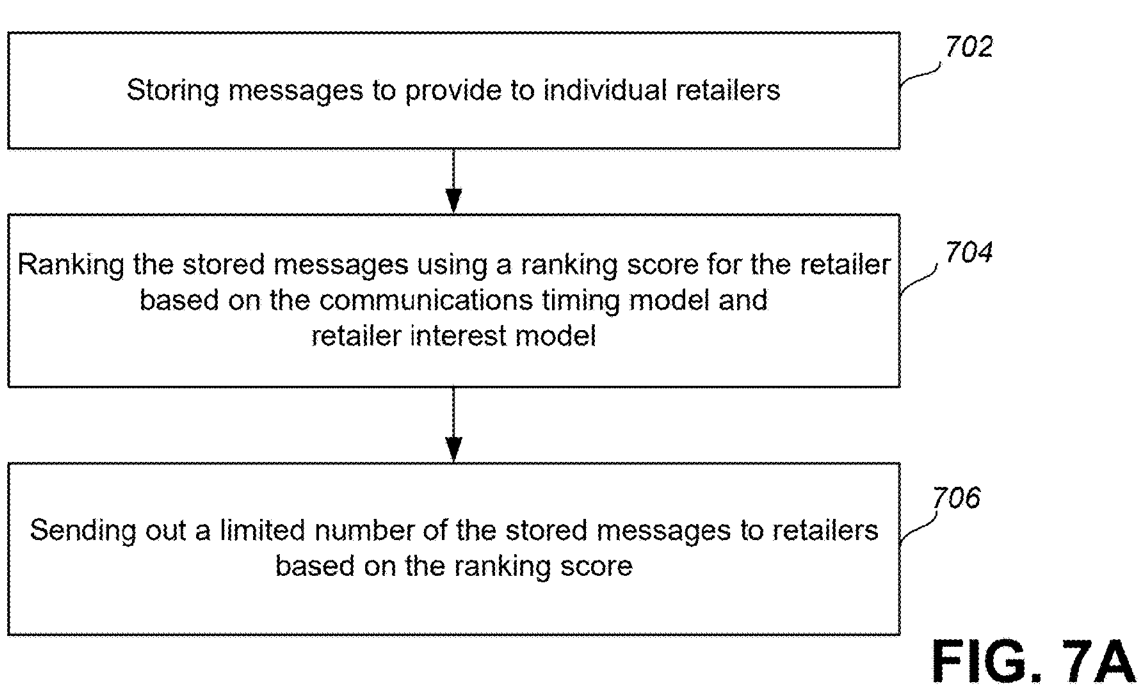
FIG. 7A
Decision Engine
312
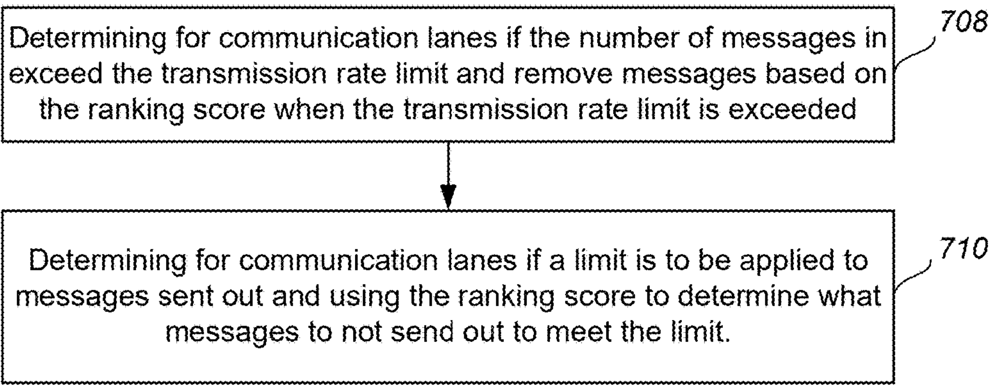
FIG. 7B

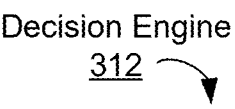

FIG. 7C

Providing a centrally managed filtering system to provide quality checks on messages to send to retailers (712)

Providing a retailer quality check in the filtering system wherein the stored messages are filtered and not sent out to any disqualified retailers including ones who fail identification verification or who are otherwise blocked from receiving the stored messages that are inapplicable to the particular retailer (714)

Providing a product message quality check in the filtering system wherein stored messages for undesirable products are filtered and not sent (716)

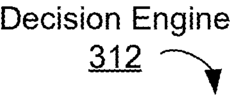

FIG. 7D

Providing a centrally managed filtering system to provide timing quality checks to control when messages are sent to retailers (722)

Providing a rescheduling quality check in the timing quality checks to reschedule messages that are scheduled for a retailer that do not match the retailer's preferred timing window for receipt (724)

Providing a message expiration check in the timing quality checks to filter out stored messages that have an expired send out time limitation (726)

OUTGOING COMMUNICATION PLANNER UTILIZING MACHINE LEARNING

FIELD

Embodiments of the present technology generally relate to a business-to-business (B2B) marketplace platform, and more specifically, to using machine learning to plan communication of messages in a B2B marketplace platform.

BACKGROUND

A B2B marketplace platform may enable messages, such as advertisements and promotions, to be sent to retailers for products available for purchase from brands (aka wholesalers). For such a B2B marketplace to operate effectively, controls on messages should be exercised to ensure that retailers maintain interest in the messaging. Uncontrolled messaging can damage wholesalers' relationships with retailers and can cause the retailer to block or ignore further messages from the wholesaler.

SUMMARY

Embodiments described herein provide computer implemented methods and systems for controlling the sending of messages to retailers utilizing a business-to-business (B2B) marketplace platform that can be used to make product orders. In accordance with certain embodiments, a method uses machine learning to train a communications timing model and to train a retailer interest model based on one or more past messages sent to and received by each retailer of one or more retailers. The method then uses the communications timing model (which has been trained) to determine, for each retailer of two or more of the retailers, a preferred timing for receiving one or more of the messages from the B2B marketplace. The method also uses the retailer interest model (which has also been trained) to determine, for each retailer of two or more retailers, a respective level of interest for each of a plurality of different message types that may be sent by the B2B marketplace. The messages sent by the B2B marketplace may have been originally generated by a wholesaler (aka a brand) that sells their products using the B2B marketplace. Alternatively, or additionally, the messages sent by the B2B marketplace may have been originally generated by the B2B marketplace itself. The method further includes using a decision engine to schedule and control when and which of the messages are to be sent to each retailer of two or more of the retailers based on outputs of the communications timing model and the retailer interest model.

In certain embodiments, the communications timing model of the method determines the preferred timing for a given one of the retailers based on when the given one of the retailers opens one or more of the messages sent to the given one of the retailers. Further, the communications timing model can emphasize when one or more of the messages opened by the given one of the retailers results in one or more product orders. Further, the communications timing model can determine timing for future messages based on how many of the messages sent to a given one of the retailers are opened during a given time period and can set a limit on the number of messages that can be sent to the given one of the retailers during the given time period based at least in part on how many of the one or more messages are opened by the given one of the retailers during the time period.

In certain embodiments, the communications timing model includes grouping similar types of messages for the given one of the retailers into a same communication lane of a plurality different communication lanes. One or more of the messages are eliminated from the communication lane when there is more than a message transmission rate limit.

In certain embodiments, the retailer interest model determines interests of the given one of the retailers by identifying the one or more types of the messages opened by the given one of the retailers and places a limit on the one or more types of messages that can be sent to the given one of the retailers based on the interest of the given one of the retailers. The one or more types of messages are selected from a group including two of the following: business transaction type messages; product launch type messages; incentive type of messages; marketing type of messages; and strategic type messages targeted to a particular one of the retailers.

In certain embodiments, the decision engine performs tasks to schedule sending of the one or more messages. The decision engine first stores the one or more messages in a communication lane that is scheduled to be sent to a given one of the retailers. The communication lanes are defined to store similar types of messages for a given one of the retailers. The decision engine then ranks the stored messages using a ranking score for the one or more retailers, wherein the ranking score is calculated based on the communications timing model and the retailer interest model. The decision engine then controls which of the one or more messages in the communications lane are sent out to the one or more retailers based on the ranking score.

In certain embodiments of the decision engine, filtering of the stored messages in a centrally managed filtering system can be provided based on quality checks. In a first filtering system, a retailer quality check determination can be made wherein the stored messages to be sent to a disqualified one of the retailers who failed identification verification confirmation are filtered out and not sent to the disqualified retailer. In another filtering system, a message quality check determination can be made wherein the stored messages that recommend products that are not of interest to a given one of the readers are filtered out and not sent out to that given retailer.

In certain embodiments of the decision engine with filtering, filters are applied based on timing conflict checks. In a first such filtering system, a rescheduling check is applied to filter out the stored messages that do not match a given one of the retailer's preferred timing window and reschedule the filtered out messages to a time when the send time matches the given retailer's preferred timing window. In another such filter, a message expiration check is provided to filter out the stored messages that have an expired send out time limitation.

In certain embodiments, a system for controlling sending of messages to one or more retailers that utilizes a business-to-business (B2B) marketplace platform to make product orders is provided. The system includes a data store that stores the messages that are to be scheduled to be sent to the one or more retailers, along with one more processors interfaced with the data store to perform operations for the system. The operations include using machine learning to train a communications timing model and to train a retailer interest model based on one or more past messages sent to and received by each retailer of one or more retailers; machine learning to train a communications timing model to determine, for each retailer of two or more of the retailers, a preferred timing for receiving one or more of the messages from the B2B marketplace. The operations further include using the retailer interest model to determine, for each retailer of two or more retailers, a respective level of interest for each of a plurality of different message types that may be sent by the B2B marketplace. The operations then include using a decision engine to schedule and control, for each retailer of two or more of the retailers, based on outputs of the communications timing model and the retailer interest model, when and which of the messages are to be sent to the retailers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6A is a high level flow diagram used to summarize methods used with respect to a retailer interest model of the outgoing communications planner of FIG. 3A according to certain embodiments.

FIG. 6B is a high level flow diagram used to summarize methods used with respect to a retailer interest model to obtain feedback information after the outgoing communications planner of FIG. 3A sends out messages as shown in FIG. 3B.FIG. 7A is a high level flow diagram used to summarize methods used with respect to a decision engine of the outgoing communications planner of FIG. 3A according to certain embodiments.

FIG. 7B is a high level flow diagram used to summarize methods used with respect to a decision engine when a communications lane is used that includes messages with a limited number that are to be sent out.

FIG. 7C is a high level flow diagram used to summarize methods used with respect to the decision engine of FIG. 3A showing a filtering system to provide quality checks on outgoing messages according to certain embodiments.

FIG. 7D is a high level flow diagram used to summarize methods used with respect to a decision engine of FIG. 3A showing a filtering system to provide timing quality checks on outgoing messages according to certain embodiments.

DETAILED DESCRIPTION

Figure 1:
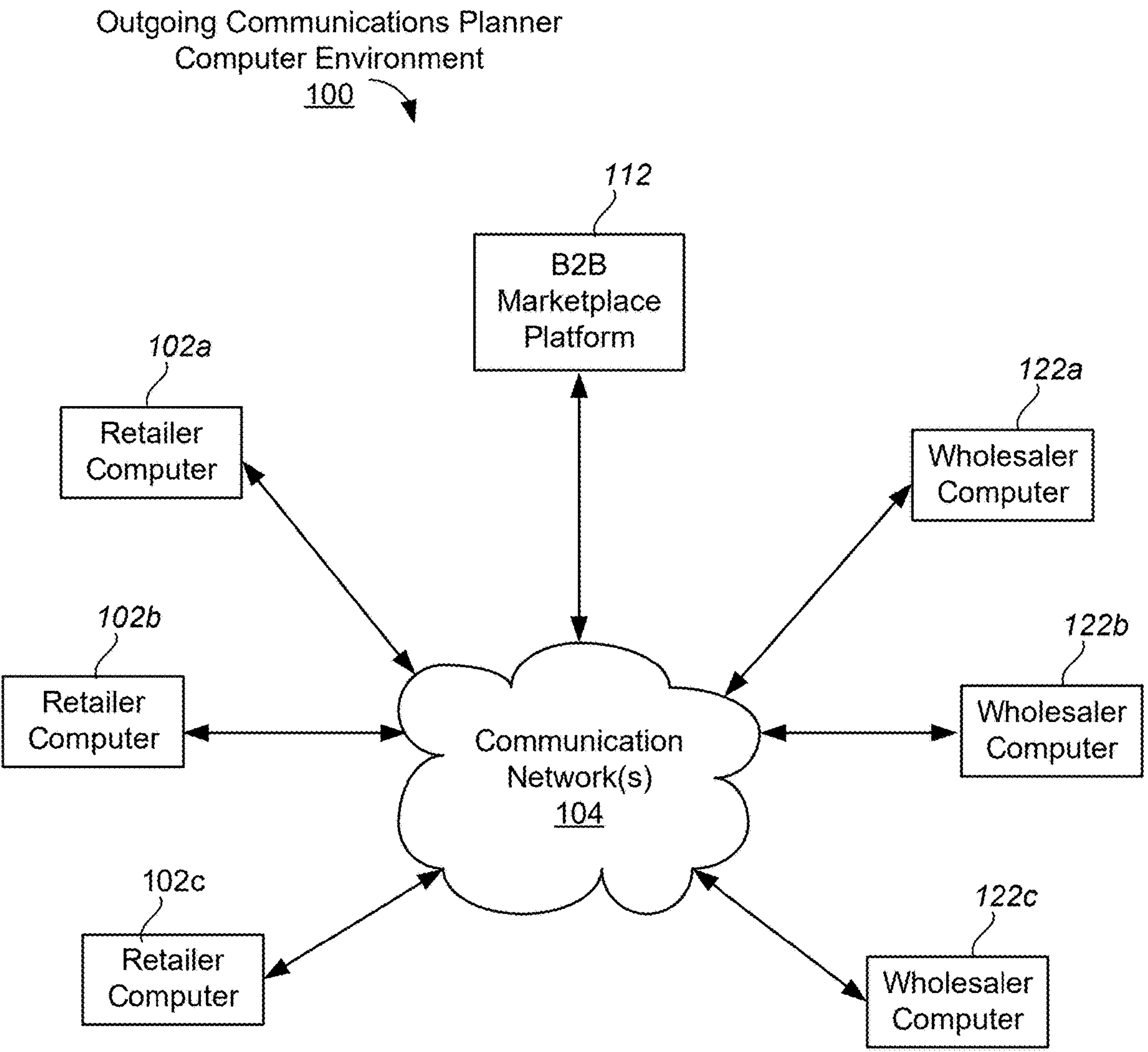
FIG. 1 is a high level block diagram that is used to describe an example computer implemented environment in which certain embodiments of the present technology may be utilized.

Certain embodiments described herein provide an outgoing communication planner utilizing machine learning for selectively sending messages to retailers utilizing a B2B marketplace platform both to control message timing and to place limitations on the number and/or types of messages sent.

Wholesalers may send out emails or push other types of notifications to retailers to market their products. A wholesaler's sending out all messages at random time periods can serve well at the early stages of the wholesaler's relationship with a retailer and may enable the wholesaler to move fast and drive tremendous business impact quickly. However, as business grows, better control of the marketing and other messages from the wholesalers, including when the marketing messages are sent out can, become more important for customer relationship management. A technical automated system that controls the timing of the messages sent at later stages in the wholesaler's relationship with a retailer can avoid messages being sent at inopportune times that could avoid damage to goodwill the wholesaler has established with the retailer.

In particular, the outgoing communications planner of embodiments described herein provides a gateway for communications sent out to retailers, with the gateway behaving like the ultimate decision maker of timing for when messages should be sent out, as well as placing limitations on which messages should be sent. Timing controls can be achieved by monitoring the times retailers open messages and sending messages out accordingly. However, placing limits on what messages can be sent out requires a deeper learning about the retailers' preferences and is more difficult to technically evaluate and provide to enhance the retailers' experience. Embodiments described herein provide control of timing and limiting of messages sent to retailers. Some of the messages that are sent to retailers can originate from the brands (aka wholesalers), wherein such messages may be marketing messages, but are not limited thereto. Other messages may originate from the provider of the B2B platform, wherein such messages may inform retailers of outstanding invoices, provide credit limit adjustments, and/or the like.

To further enhance the messaging system with both message timing and messaging limiting control, aggregation of messages into communication lanes is provided. Aggregation, queuing or placing the messages in a communication lane directed to a retailer enables more precise and efficient control of the messages. Such communication lanes better enable messages to be provided with both timing and limiting control when applicable with the simple goal of providing the best retailer experience.

A problem with not providing outgoing communication planning that limits messages sent is that retailers can become inundated with a large number of marketing communications and become irritated causing the retailer to lose interest in the message content. Certain embodiments described herein provide a solution to avoid these negative consequences by providing a B2B outgoing communications planner that uses machine learning to identify the retailers' preferences, including both timing of the messages as well as limiting messages based on content of the messages, with the B2B outgoing communication planner sending the messages out accordingly. Embodiments described herein provide such systems and methods with aggregation of messages into communication lanes to send to retailers the messages using queues or channels when possible. However, before providing additional details of such embodiments of the present technology, FIGS. 1 and 2 will initially be used to provide a description of an example environment in which embodiments of the present technology can be implemented.

Referring to FIG. 1, shown therein is an example computer implemented environment 100 including a plurality of retailer computers 102*a*, 102*b*, 102*c* and a plurality of wholesaler or brand computers 122*a*, 122*b*, 122*c* that are able to interface with a B2B marketplace platform 112 via one or more communication network(s) 104. The communications network(s) 104 may include any suitable one or more communication networks, such as, the Internet, a wide area network (WAN), a metropolitan area network (MAN), a wireless local area network (WLAN), a personal area network (PAN) such as Bluetooth®, a radio access network (RAN) such as a Fifth Generation (5G) New Radio (NR) system, a wired network, a cable network, a satellite network, or combinations thereof, but are not limited thereto. The retailer computers 102*a*, 102*b*, 102*c*, which can be referred to collectively as retailer computers 102, or individually as a retailer computer 102, are computers of retailers that sell products (aka goods) to consumers (aka customers) via online-stores and/or a brick and mortar (BM) stores. The wholesaler computers 122*a*, 122*b*, 122*c*, which can be referred to collectively as wholesaler computers 122, or individually as a wholesaler computer 122, are computers of brands (aka wholesalers) that sell products (e.g., apparel, kitchenware, beauty and wellness supplies, home decor, jewelry) to the retailers. Each of the retailer computers 102 and wholesaler computers 122 can include, e.g., one or more processors, memory, a display, and a communication interface that enable the computers to access and thereby transmit and receive communication message via the communication network(s) 104. Example types of such computers 102 and 122 include personal computers (PCs), tablet computers, mobile phones, and/or the like.

The B2B marketplace platform 112 enables retailers to connect with wholesalers via the retailer computers 102 without needing to travel to multiple tradeshows, which travel can be expensive, time consuming, and can increase the carbon footprint of the retailers and the brands. For example, the B2B marketplace platform 112 offers retailers a toolkit of technology, data insights, product marketing information, financial terms, and logistics solutions to support the retailers using the retailer computers 102 to order products from the wholesalers. Further, the B2B marketplace platform 112 enables wholesalers to connect with retailers via the wholesaler computers 122 without needing to navigate networks of independent sales representatives or travel to trade shows. For example, the B2B marketplace platform 112 offers wholesalers a toolkit of technology, data insights, financial terms, logistics solutions and the ability to send marketing messages to support the brands using the wholesaler computers 122 to sell their products to the retailers. In accordance with certain embodiments, software applications that are provided by the B2B marketplace platform 112 are software as a service (SAAS) type software applications that retailers and brands can access via web-browsers on the retailer computers 102 and the wholesaler computer 122. Alternatively, the B2B marketplace platform 112 can provide downloadable type software applications that can be downloaded locally to the retailer computers 102 and the wholesaler computer 122.

Figure 2:
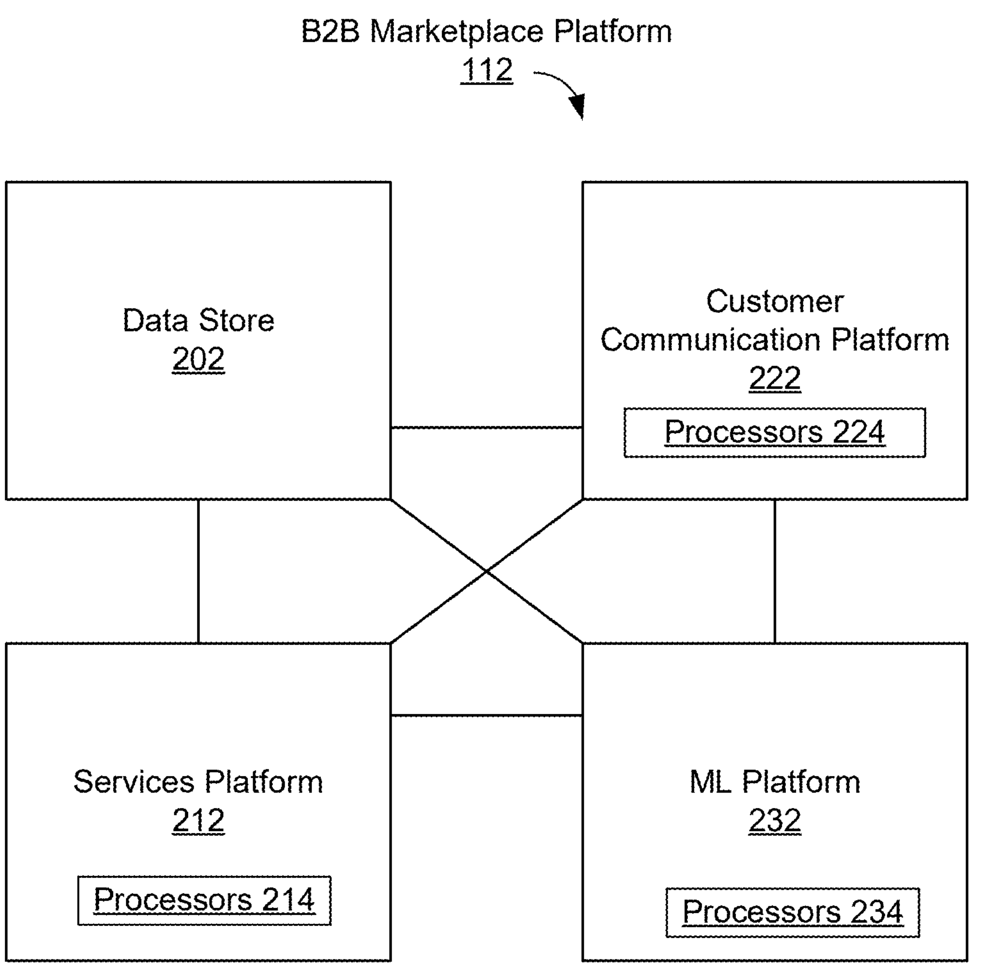
FIG. 2 is a high level block diagram showing example details of a B2B marketplace platform introduced in FIG. 1.

FIG. 2 will be used to provide example details of the B2B marketplace platform 112 introduced in FIG. 1. Referring to FIG. 2, the B2B marketplace platform 112 is shown as including data store 202, services platform 212, costumer communication platform 222, and machine learning (ML) platform 232. The data store 202 can, e.g., include one or more databases that store data about brands (aka brand data), data about products sold by brands (aka product data), data providing marketing information and promotions, data about retailers and their habits and preferences, and/or the like. The data store 202 can store raw unstructured data and a data warehouse that stores structured and filtered data that has already been processed for one or more purposes. The data store 202 can be implemented using cloud and/or non-cloud based storage. As will be appreciated from the discussion below, certain types of retailer data for a retailer, that can be stored in the data store 202 are features and feature values for each retailer that are determined by machine learning (ML) models implemented within the ML platform 232.

The services platform 212 can include service applications implemented by one or more processors 214 to perform services that are offered by the B2B marketplace platform 112. Examples of such services include website support services, brand sales services for use by brands, brand purchasing services for use by retailers, data insight services, financial services, logistic (e.g., shipping) services, marketing and other communication messages transmission services.

For an individual retailer, the service platform 212 can for example, keep track of what messages the retailer reads, wherein the term reads is used herein synonymously with the terms opens or clicked-on. Further for messages a retailer reads, the service platform can keep track of whether the retailer buys a product advertised in the message, what times the retailer typically reads messages, and how many of a large group of messages the retailer reads in a given time period, which can also be referred to as a given time period.

As will be appreciated from the discussion below, in accordance with certain embodiments of the present technology, the services platform 212 may utilize the ML platform 232 to autonomously identify a retailer's message response habits. For example, over time, the ML can better and better determine what marketing messages a particular retailer is more likely to respond to and how they will respond. In accordance with certain embodiments, the services platform 212 may autonomously adjust when and what messages are sent to a given retailer based on predictions and/or other data produced by the ML platform 232.

Still referring to FIG. 2, the customer communication platform 222 can include communication applications implemented by one or more processors 224 to provide communications between various different types of customers of the B2B marketplace platform 112, which customers include the retailers and the wholesalers, as well as to support communications between the B2B marketplace platform 112 and its customers (the retailers and/or the wholesalers). For example, the customer communication platform 222 can provide reminders to retailers of product promotion discount deadlines. For another example, the customer communication platform 222 can also be used to inform a retailer of a new product offered by a brand or a new version of an older product.

Still referring to FIG. 2, the ML platform 232 can include machine learning applications implemented by one or more processors 234 that implement ML models. In accordance with certain embodiments, such ML models are used to identify the preferences of users both in what products they like as well as timing of when they like to receive marketing and/or other types of messages.

Different processors can be used to implement the services platform 212, the customer communication platform 222, and the ML platform 232. In other words, the processors 214, 224, and 234 can differ from one another. Alternatively, the same processors, or at least some of the same processors, can be used to implement the services platform 212, the customer communication platform 222, and the ML platform 232. In other words, the processors 214, 224, and 234 can be the same processors, or at least some of the processors 214, 224, and 234 can be the same processors.

Figure 3A:
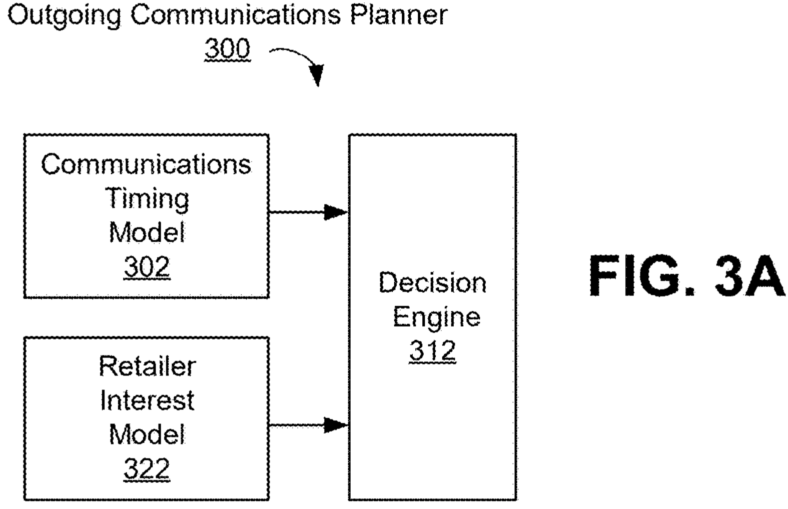
FIG. 3A is a high level block diagram illustrating components of an outgoing communications planner according to certain embodiments of the present technology.

FIG. 3A is a high level block diagram of components of an outgoing communications planner 300 in accordance with certain embodiments of the present technology. The components include a communications timing model 302, a retailer interest model 322, and a decision engine 312. The communications timing model 302 provides, for each retailer, a preferred timing of receiving messages from wholesalers. The retailer interest model 322 provides, for each retailer, the retailer's interest in particular types of messages by identifying, for example, the past messages read by the retailer, and whether particular messages resulted in an order. Additionally, the decision engine 312 determines ranking scores for messages that may be sent out to individual retailers based on information received from the communications timing model 302 and the retailer interest model 322 and determines when and which messages to send based on the ranking scores.

The communications timing model 302 and the retailer interest model 322 of FIG. 3A may use all of the components of the marketplace platform 112 of FIG. 2. Both the communications timing model 302 and the retailer interest model 322 can, for example, operate as part of the services platform 212 to identify characteristics of retailers using interaction with retailers through the customer communications platform 222. The information obtained about characteristics of retailers can then be stored in data store 202. To predict future characteristics of retailers, the information stored in data store 202 can be used by the machine learning (ML) platform 232, with the ML results can also be stored in data store 202.

In FIG. 3A, the decision engine 312 receives the information from the communications timing model 302 and the retailer interest model 322 and plans outgoing communication of messages to retailers based on the information. The decision engine 312, like the communications timing model 302 and retailer interest model 322, uses components of the marketplace platform 112 of FIG. 2. The decision engine 312 uses the services platform 212 to perform its operations and retrieves information about retailers as stored in the data store 202. The decision engine 312 then schedules messages and enables transmission of the messages using the customer communications platform 222. The decision engine 312 uses information from the ML platform 232 that is learned about the retailers to enable scheduling of messages either directly from the ML platform 232 without obtaining the information from the data store 202 or indirectly from the ML platform 232 by obtaining information that was previously stored in the data store 202.

Figure 3B:
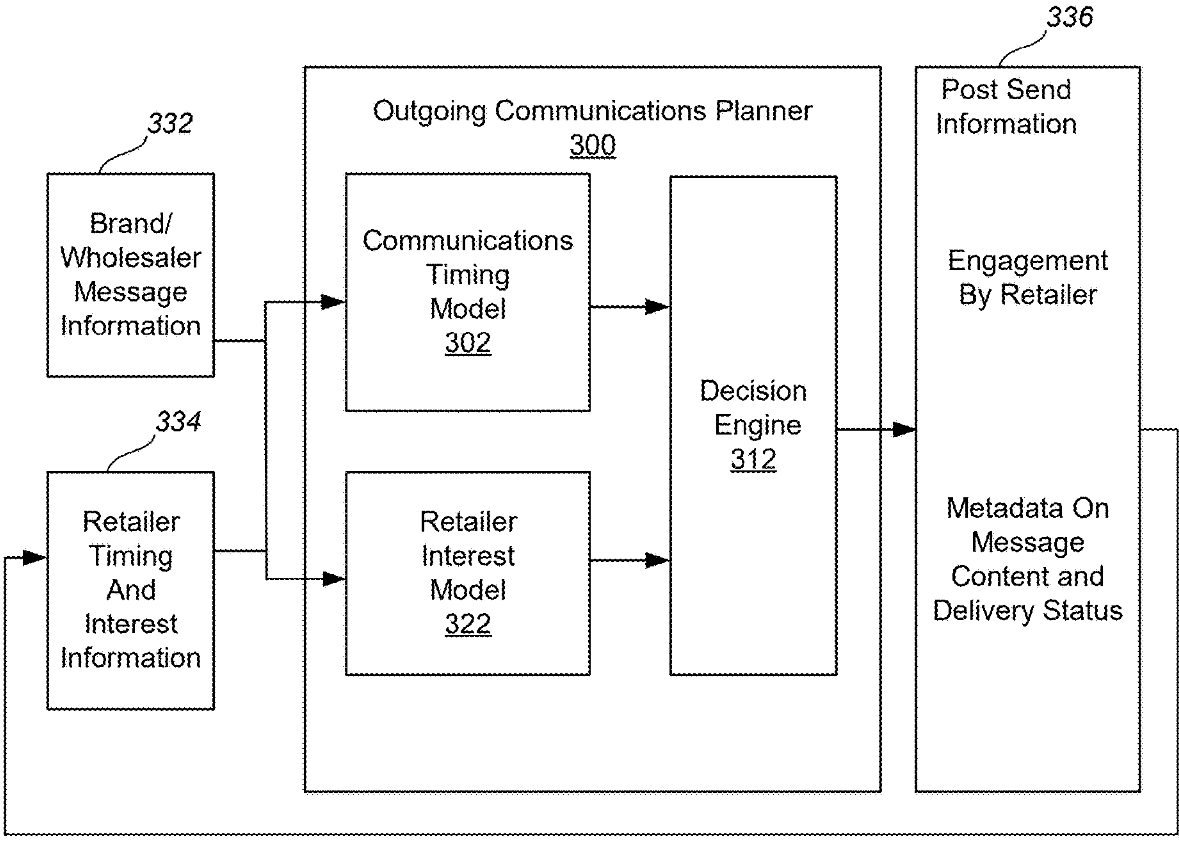
FIG. 3B is a high level block diagram illustrating components of an outgoing communications planner along with information provided including brand messages as well as retailer preference and feedback from outgoing messages showing retailer preferences.

FIG. 3B is a high level block diagram illustrating components of the outgoing communications planner 300 along with information provided to and from the outgoing communications planner 300 including brand messages and message information 332 as well as retailer timing and interest information 334 that includes information fed back from the outgoing messages. The brand messages and message information 332 is provided to both the communications timing model 302 and the retailer interest model 322. The brand messages and message information 332 includes actual messages originating from the brands, plus information about such messages. The brand messages and message information 332 includes the actual messages that are provided to the communications timing model 302 to enable the messages to be scheduled for send out time-wise. The brand messages and message 332 also includes information that can be included with the actual messages, or sent separate from the actual messages and that information can internally include desired timing to send out the actual messages provided from a brand as well as metadata information to enable the communications timing model 302 to determine available timing for sending the messages. The brand messages and message information 332 is further provided to the retailer interest model 322. The brand messages and message information 332 will reveal for the retailer interest model 322 the type of message as well as the contents of the messages to enable the messages to be evaluated by the retailer interest model 322 for retailer interest to enable scheduling message send out.

FIG. 3B further shows that retailer timing and interest information 334 is provided to both the communications timing model 302 and the retailer interest model 322. The retailer timing and interest information 334 can be gathered about the retailer to identify the timing of when a retailer prefers to receive certain messages as well as information on what type of messages the retailer prefers at certain times. The retailer timing and interest information 334 is provided to the communications timing model 302 because it provides retailer interest about timing of message sending, as well as to the retailer interest model 322 because it provides information about what the retailers' interest are in particular messages.

FIG. 3B further shows the post send information 336 that is fed back to be part of the retailer timing and interest information 334. The post send information 336 is obtained after messages are sent out from the outgoing communications planner 334 and used to determine retailer interest. As shown, the post send information 336 can include "engagement by retailer" information which can include information about a retailer opening a message sent or ordering a product advertised by a message sent. The post send "engagement by retailer" information 336 can similarly show if a retailer blocked a message. The post send information 336 can further provide metadata information from the sent messages to enable an efficient estimation of future retailer interest information.

Details of operation of the components of the outgoing communication planner 300 are described in further detail with respect to subsequent figures.

Figure 4:
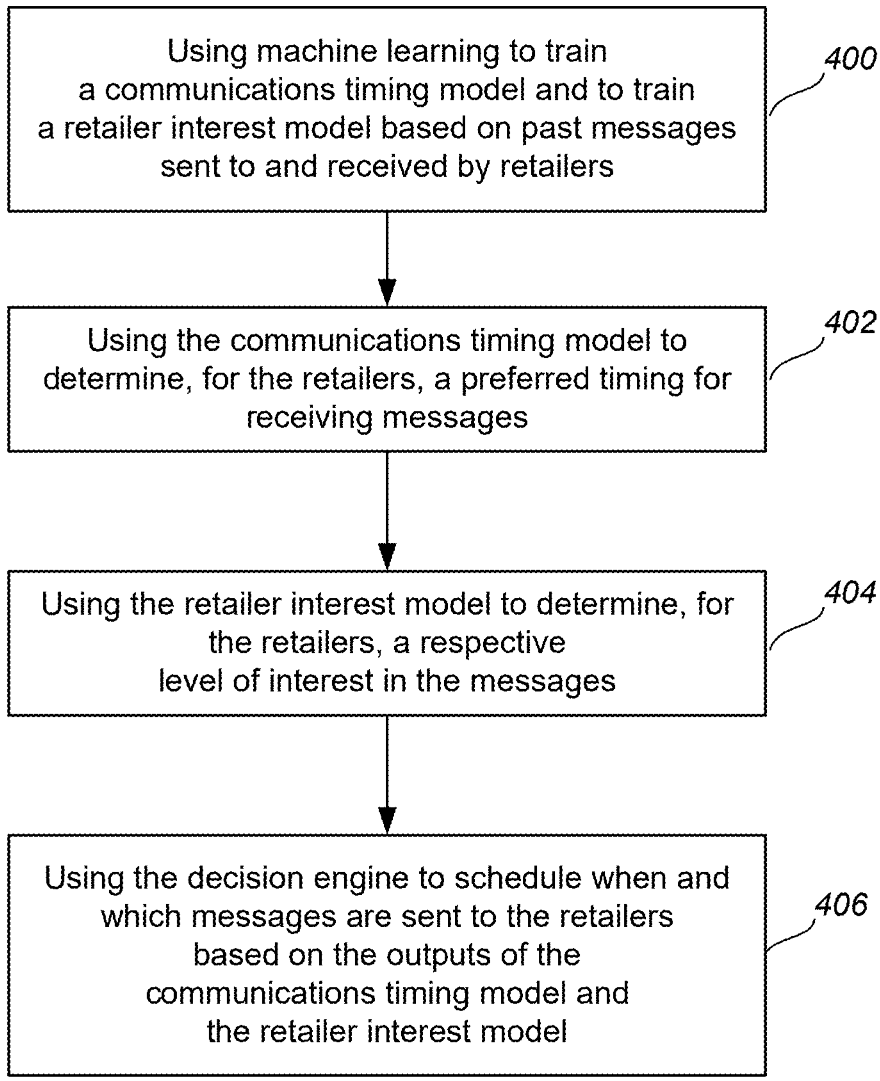
FIG. 4 is a high level flow diagram used to summarize methods performed using the outgoing communications planner of FIG. 3A according to certain embodiments of the present technology.

FIG. 4 is a high level flow diagram used to summarize the operation methods according to certain embodiments for using the components of the outgoing communications planner 300 of FIG. 3A. The operations of FIG. 4 begin with step 400 where the ML platform 232 is used to train the communications timing model 302 of FIG. 3 and to train a retailer interest model 322 of FIG. 3 based on one or more past messages sent to and received by each retailer of one or more retailers. Then in step 402 the communications timing model 302 of FIG. 3, which has been trained, is accessed and used to determine, for individual retailers, a preferred timing for receiving messages. In step 404 the retailer interest model 322 of FIG. 3, which has been trained, is accessed and used to determine, for the individual retailers, a respective level of interest in the messages. Further, in step 406, the decision engine 312 schedules when and which messages are sent to individual ones of the retailers based on the outputs of the communications timing model 302 and the retailer interest model 322 directly, indirectly from the storage in the data store 202, or indirectly from the ML platform 232 where machine learning was applied to create a prediction of retailer interest in the new messages to be distributed by the decision engine 312. It is noted that the order of steps 402 and 404 can be reversed, or steps 402 and 404 can be performed at the same time.

Figure 5A:
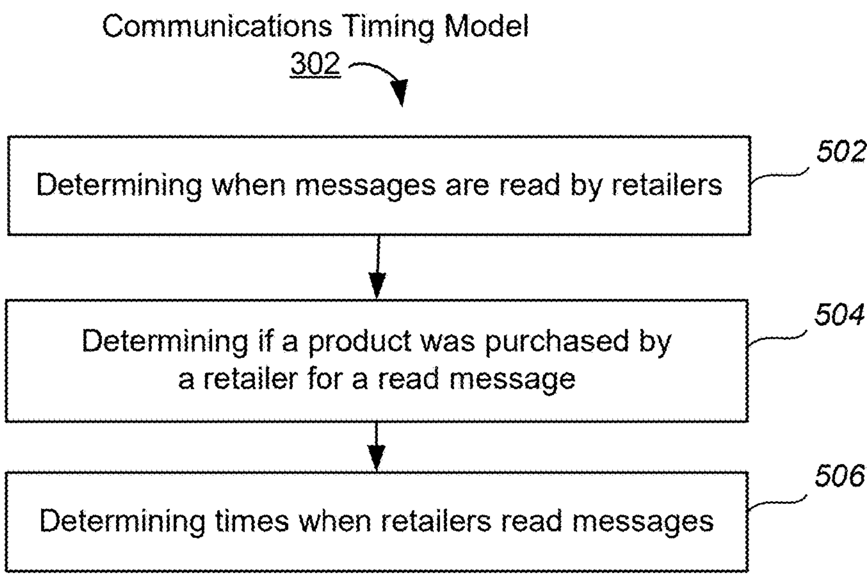
FIG. 5A is a high level flow diagram used to summarize methods used with respect to a communications timing model of the outgoing communications planner of FIG. 3A according to certain embodiments of the present technology.

FIG. 5A is a high level flow diagram used to summarize more specific method steps used with respect to a communications timing model 302 of the outgoing communications planner of FIG. 3 according to certain embodiments of the present technology. Initially, in step 502 the communications timing model 302 determines when messages are read, the term read being used synonymously, with open or clicked-on, by the retailers. Optionally in a further step 504, the communications timing model 302 can determine if messages read by a retailer resulted in a product purchase. Optionally in a still further step 506, the communications timing model 302 can log a time when the retailer read the message to better predict in the future the retailer's typical timing for reading messages so that messages can be sent at that time or within a window of time including that time. In certain embodiments, the communications timing model 302 can determined whether a retailer's opening (aka reading or clicking-on) a message within a certain time period (e.g., between 9:00 a.m. and 10:00 a.m.) compared to other time periods (e.g., between 10:00 a.m. 6:00 p.m.) increases the likelihood that the retailer orders one or more products.

Figure 5B:
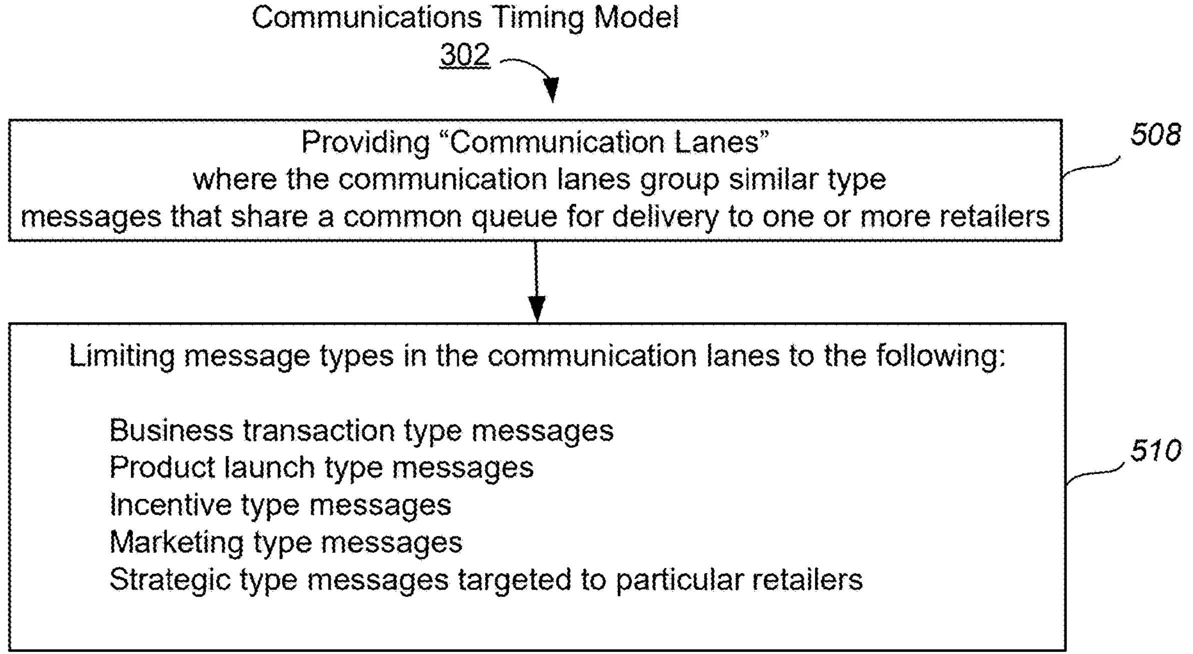
FIG. 5B is a high level flow diagram use to show methods of use of communication lanes in conjunction with a communications timing model of the outgoing communications planner of FIG. 3 according to certain embodiments.

FIG. 5B is a high level flow diagram used to further show methods of use of the communications timing model 302 to include communication lanes. Initially for the steps of FIG. 5B a "communications lane" is defined herein as a queue or channel that stores similar types of messages grouped together for delivery to one or more retailers. The operation step 512 of FIG. 5B, thus, begins by providing the communication lanes by grouping similar message types together in a common queue (aka a common communication lane). The communication lanes can share a common delivery timing window for one or more retailers when all of the messages provided in a communication lane are sent together within a time window. With the messages in a communication lane being sent together within the timing window, a frequency or transmission rate limit can apply, with some messages not being sent out if the rate limit would be exceeded as discussed subsequently. The "communications lane" herein can also be referred to as a "swim lane" noting their similarity to swim lanes in a swimming pool that can be allocated to allow only similar swimmers to use the lane. In subsequent operation step 510, the communication lanes are optionally further separated into more granular communication lanes providing only certain message types. The message types of step 510 can include, e.g., business transaction type messages; product launch type messages; incentive type messages; marketing type messages; and strategic type messages targeted to particular retailers, but are not limited thereto.

FIG. 6A is a high level flow diagram used to summarize methods used with respect to the retailer interest model 322 of the outgoing communications planner 300 of FIG. 3A according to certain embodiments. Initially, in step 600 the interest of the retailers is determined using the retailer interest model 322 by identifying the type of past messages read or opened by the retailers, as well as whether such messages resulted in product orders. In some embodiments that have defined communications lanes, the retailer interest model 322 provides a ranking of the messages in the communication lanes in a step 602. The ranking can be used to eliminate the lowest ranked messages when a limited number of messages are sent as discussed subsequently.

FIG. 6B is a high level flow diagram used to summarize methods used with respect to a retailer interest model 322 to obtain feedback information after the outgoing communications planner of FIG. 3A sends out messages as shown in FIG. 3B. In step 604 the retailer interest model information that is gathered from messages sent out include: received messages; opened messages in the received messages; messages that were opened that resulted in an order; and unsubscribing resulting from received messages. Next step 606 reveals the metadata stored with messages providing a means for evaluation of the metadata stored to more efficiently provide information for the retailer interest model from messages sent out. The metadata can include, e.g.,: whether the message is transactional or marketing; whether there is an incentive offered in the message; and whether the message is time sensitive, but is not limited thereto.

FIG. 7A is a high level flow diagram used to summarize methods used with respect to the decision engine 312 of the outgoing communications planner 300 of FIG. 3A according to certain embodiments. The decision engine 312 begins in step 702 by storing messages that may be sent to individual retailers. The decision engine 312 then in step 704 ranks the stored messages using ranking scores based on information provided about the retailers' interests obtained from the communications timing model 302 and the retailer interest model 322. The decision engine 312 next in step 706 sends out a limited number of the stored messages to individual ones of the retailers based on the ranking scores, such that a rate limit is not exceeded.

The ranking score determined by the decision engine 312 can be determined based on a number of factors obtained from the communications timing model 302 and the retailer interest model 322. The ranking score information obtained from the retailer interest model 322 can include whether a similar type of message was opened by the retailer, whether the retailer ordered a product based on opening of a similar type of message, or whether the retailer unsubscribed after receiving a similar type of message in the past. The ranking score information can also be based of the relative type of message irrespective of whether the retailer opened the specific message type in the past, with some types of messages ranked higher than others based on the retailers' overall preferences. The ranking score information obtained from the communications timing model 302 can further be based on a specific timing requested for send out of the message requested by a brand and a retailer's known preferred timing window for receiving messages and whether these timings match.

FIG. 7B is a high level flow diagram used to summarize methods used with respect to the decision engine 312 when a communications lane is used that includes messages where a limited number of the messages are to be sent out. Step 708 is applied when the communications lane has a transmission rate limit. In step 708, a determination is made for a communication lane evaluated whether the number of messages in the communication lane exceeds the transmission rate limit and if so, excess messages are removed based on the ranking score determined by the decision engine 312. Step 710 is applied when messages in the communications lane for delivery are otherwise limited in number for send out. For step 710 the ranking score determined by the decision engine 312 is used to select what messages to not send out so as not to exceed the limit. An example of such a limit might be a maximum of five product launch messages and five discount messages set for a particular retailer. The ranking score would then be used to send out the top five of each type.

FIG. 7C is a high level flow diagram used to summarize methods used with respect to the decision engine 312 of FIG. 3A showing an optional filtering system to provide quality checks on outgoing messages according to certain embodiments. The quality checks are provided beginning at a step 712 where the central filtering system to provide the quality checks is introduced. In a first quality check in step 714, a retailer quality check is first provided. For the retailer quality check step 714, messages are filtered out and not sent to any disqualified retailer, including a retailer who has failed a quality check such as an identification verification or a retailer blocked from receiving the type of message where the message is inapplicable to the retailer. Next in step 716 a further product message quality check is provided. For the product message quality check step 716, stored messages for products that are not of interest to a given retailer or that is otherwise undesirable for the particular retailer or potentially any retailer is filtered out and not sent. The order of the steps shown in FIG. 7B-C can be changed. Additionally, it is possible that only one or more of the steps shown in FIG. 7B-C are performed by the filtering system.

FIG. 7D is a high level flow diagram used to summarize methods used with respect to a decision engine of FIG. 3A showing a filtering system to provide timing quality checks on outgoing messages according to certain embodiments. The timing quality checks are provided beginning at a step 722 where the central filtering system that provides the timing quality checks to control timing of when messages are sent out to retailers is introduced. In a first such timing quality check in step 724 a rescheduling quality check is provided. In the rescheduling quality check of step 724, messages are scheduled for a retailer that do not match the retailer's preferred timing window for receipt. In a second timing quality check in step 726, a message expiration check is made. In the message expiration check in step 726, the timing quality check filters out stored messages from sending that have an expired send out time limitation.

Figure 8:
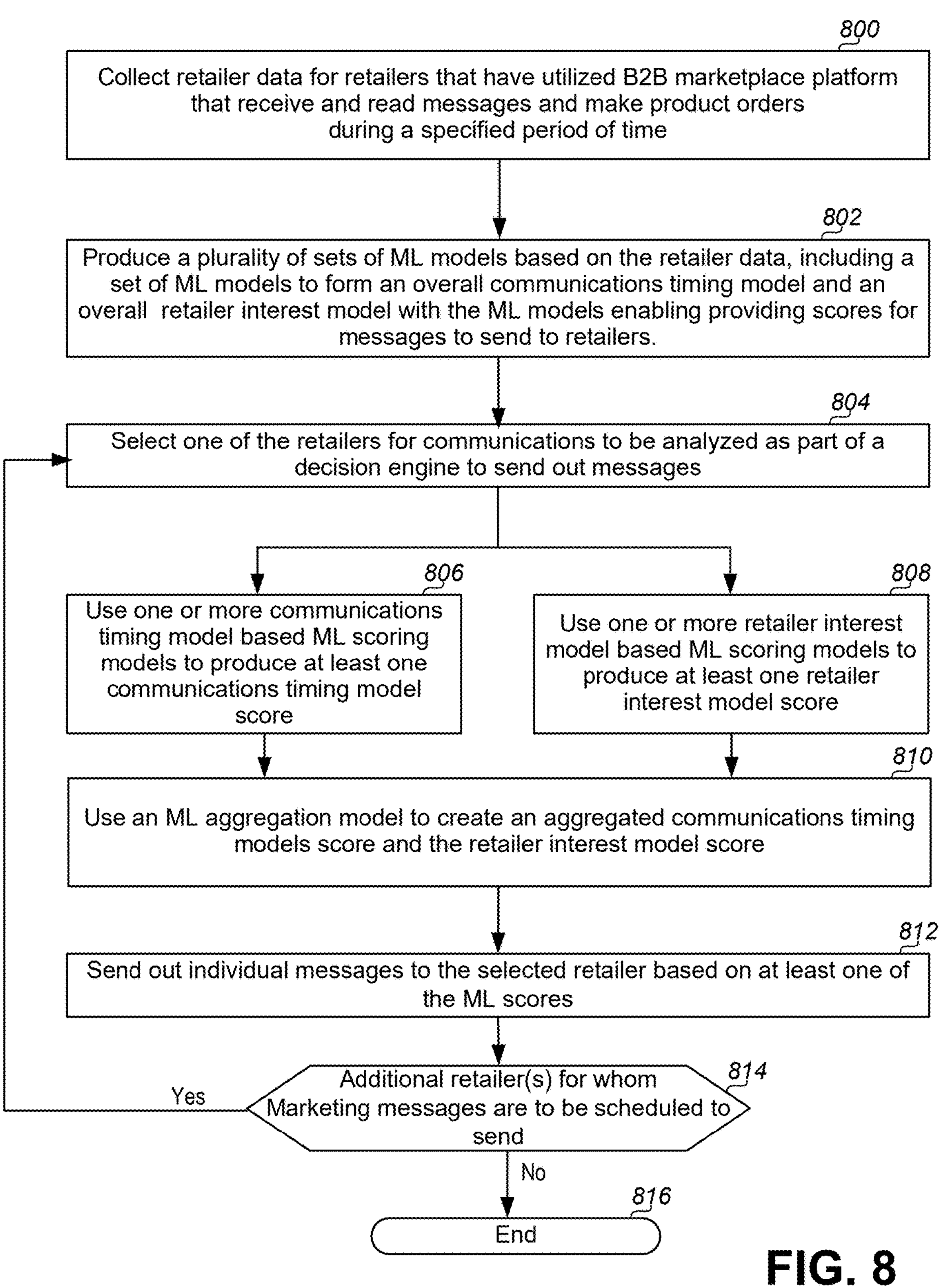
FIG. 8 is a high level block diagram high level flow diagram used to summarize methods according to certain embodiments of the present technology that use machine learning (ML) to control when messages are delivered to retailers.

FIG. 8 is a high level block diagram high level flow diagram used to summarize methods according to certain embodiments of the present technology that use machine learning (ML) to adjust when messages are delivered to retailers. Certain embodiments discussed herein use ML models that form part of the ML platform 232 of FIG. 2 to better identify retailer preferences for messages. The different ML models obtained in FIG. 8 can be individually used or aggregated together to enable messages to be selected to schedule outgoing communications. The ML models enable creation of one or more scores for messages and retailers that is used by the decision engine 312 to control sending of the messages according to embodiments of the outside communications planner.

FIG. 8 begins with step 800 that involves collecting data for each retailer to enable teaching of the ML platform about how the retailers receive and read messages and make product orders during specified periods of time and/or in response to certain types of messages. Next in step 802, a plurality of sets of ML models are produced based on the retailer data obtained with regard to specific messages in step 800 to form the communications timing model 302 and the retailer interest model 322 with the ML models enabling providing scores for the individual messages to schedule to send to retailers.

FIG. 8 continues operations with step 804 that forms part of a decision loop for the decision engine to schedule messages. In step 804 one of the retailers for receiving communications is selected to be analyzed as part of the decision engine to send out the messages. After step 804, operation splits into two separate paths, one path begins with step 806 for the communications timing model and the other path begins with step 808 with the retailer interest model. In step 806, the communications timing model based ML scoring model is used to produce at least one communications timing model score. Similarly, in step 808, the retailer interest model based ML scoring model is used to produce at least one retailer interest model score. Next in step 810 an ML aggregation model is used to create an aggregated communications timing model score and retailer interest model score to provide an overall ranking score. Further in step 812, the decision engine sends out messages to the selected retailer based on at least one of the ML scores. In step 814, the loop continues to determine if further retailers are available to be evaluated for receipt of messages. If so, operations return to step 804. If not operations end in step 816.

Figure 9:
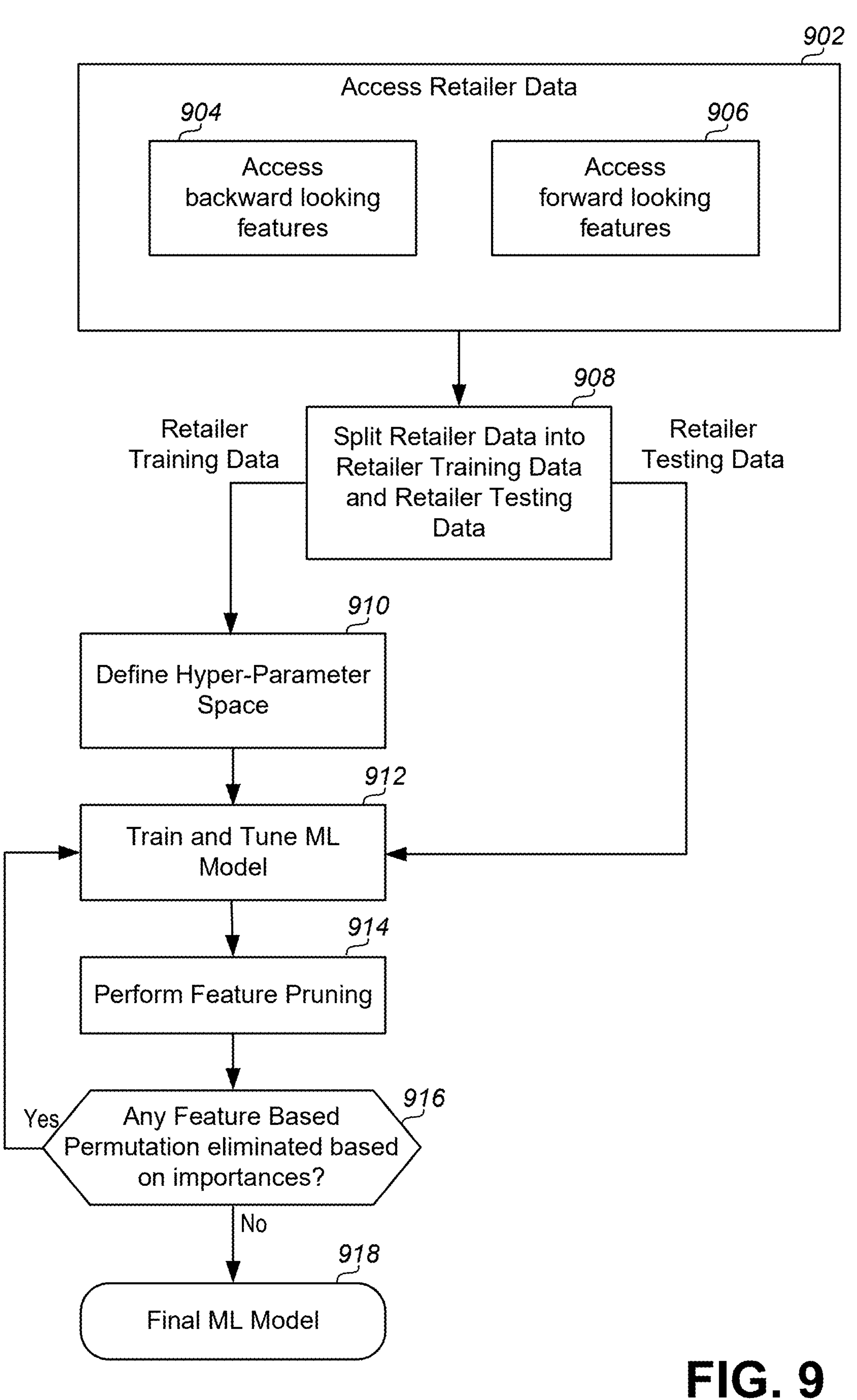
FIG. 9 is a high level flow diagram used to describe certain embodiments for generating the various ML models in one of the steps in FIG. 8.

FIG. 9 is a high level flow diagram used to describe certain embodiments for generating the various ML models in one of the steps in FIG. 8. The high level flow diagram of FIG. 9 will be used to describe methods for producing (aka generating) the ML models described above with reference to FIG. 8. Referring to FIG. 9, step 902 involves accessing retailer data (e.g., stored in the data store 202) for the communications data messages that is to be modeled using a ML model, along with retailer data collected at step 800 described above with reference to FIG. 8. Step 902 can include accessing backward looking communications messages for each retailer at sub-step 904 and accessing forward looking communications messages for each retailer at sub-step 906. As an example of a backward looking communications messages is whether a retailer has made at least one brand order within the specified window of time (e.g., one month, or two months) after the snapshot date and this is backward looking since the brand message was viewed by the retailer before the snapshot date. An example of a forward looking message is the total number of all communications messages viewed by the retailer within the specified window of time (e.g., one month, or two months) after the snapshot date.

Referring again to FIG. 9, step 908 involves splitting (aka separating) the retailer communications message data into a retailer training data set and a retailer testing data set using a random selection. For example, the splitting can be performed such that the training data set includes 80% of the retailer message receipt information, and the retailer testing data set includes 20% of the retailer message receipt information. For another example, the splitting can be performed such that the training data set includes 67% of the retailer message receipt data, and the retailer testing data set includes 33% of the retailer message receipt data. Other variations are also possible and within the scope of the embodiments of the present technology described herein.

Step 912 involves training and tuning the ML model using the retailer training data set and the retailer testing data set. The specific type of training and tuning can depend on the size of the hyperparameter space defined at step 910. For example, where the hyperparameter space defined at step 910 is relatively small, then a grid search cross validation can be performed on the retailer training data set to perform model training and hyperparameter tuning simultaneously. For another example, where the hyperparameter space defined at step 910 is relatively large, a random search cross a validation algorithm can be used to train and tune the ML model. Where numerous (e.g., hundreds) of features are collected at step 902, and or more specially at sub-step 904, it may be beneficial to reduce the computation loads required to perform training step 912 and to reduce the likelihood of dropping pairs of useful features due to high correlation in feature pruning steps, data preprocessing can optionally be performed prior to step 912 (e.g., between steps 910 and 912) to remove certain features before running the training step 912.

Step 914 involves performing feature pruning based on permutation feature importances. More specifically, the permutation feature importance, such as whether the communications message offers a time limited product promotional discount, can be calculated for each feature in the ML model from step 912. The permutation feature importance is defined to be the decrease in a model score when the single feature value is randomly shuffled. For each feature, the ML model is run multiple times to thereby provide an empirical distribution of the permutation feature importance for each feature. If the mean value is not statistically significant, the feature is dropped (aka pruned) and no longer used in modeling. So for example, a time limited product promotional discount, could be lumped together with other messages and not specifically defined. A feature may also be dropped if its permutation feature importance is too small compared to the most important feature, in order to prevent the ML model from overfitting the retailer data.

At step 916 there is a determination of whether any feature based permutation was eliminated based on importances during the most recent instance of step 914. If the answer to the determination at step 916 is Yes, the flow returns to step 912, and further training and tuning, and possibly pruning, of the ML model is performed. If the answer to the determination at step 916 is No, the flow goes to step 918 and the ML model for the cohort is finalized.

The method described above with reference to FIG. 9 can be used to produce and train each of the ML models, including those in the communication timing models 302 of FIGS. 5A-5B and the retailer interest model of FIG. 6. More specifically, the method described above with reference to FIG. 9 can be used to produce and train each of the ML scoring models for the communications timing models and the retailer interest models to obtain overall scores for each category of communications messages identified. For instance, the ML scoring models for the communications timing model and the retailer interest model can be aggregated to provide a combined score for each communication message. By aggregating scores from different models, if limited scores are provided for one model while multiple scores are provided for another model, the aggregated model can eliminate any inaccuracy in the limited single score with an overall mean score that evens out any inaccuracy. In certain embodiments, older ML scores that go beyond a set time limit in the past can be eliminated from the scores to provide more accurate scoring. The use of further alternative methods to produce and train ML models are also within the scope of the embodiments of the present technology described herein.

Embodiments of the present technology described above utilize ML models to schedule outgoing communications messages to retailers in a manner that both mitigates transmission of unwanted or unnecessary messages to retailers while also attempting to maximize the benefits to both the wholesalers and retailers so that the retailer receives the most desirable messages at the most desired times. Such embodiments of the present technology provide significant improvements over past methodologies where messages were sent out arbitrarily by human marketing personnel or machine B2B models that only dealt with message timing.

The subject matter described herein may be embodied in systems, apparatus, methods, and/or articles depending on the desired configuration. In particular, various implementations of the subject matter described herein may be realized in computer software, firmware or hardware and/or combinations thereof, as well as in digital electronic circuitry, integrated circuitry, and the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, certain the subject matter described herein may be implemented on a computer having a display device (e.g., a touch-sensitive display, a non-touch sensitive display monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input, depending upon implementation.

The subject matter described herein may be implemented in a computing system that includes a back-end component (e.g., as a data server), or that includes a middleware component (e.g., an application server), or that includes a front-end component (e.g., a client computer having a graphical user interface (GUI) or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include, but are not limited to, a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present technology have been described above, it should be understood that they have been presented by way of example, and not limitation. It will be apparent to persons skilled in the relevant art that various changes in form and detail can be made therein without departing from the spirit and scope of the technology. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. One skilled in the art will recognize that these functional building blocks can be implemented by discrete components, application specific integrated circuits, processors executing appropriate software and the like or any combination thereof.

The breadth and scope of the present technology should not be limited by any of the above-described exemplary embodiments but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for controlling sending of messages to retailers that utilize a business-to-business (B2B) marketplace platform to make product orders, the method comprising:

using machine learning to train a communications timing model and to train a retailer interest model based on one or more past messages sent to and received by each retailer of a plurality of retailers;

using the communications timing model to determine, for each retailer of two or more of the plurality of retailers, a preferred timing for the retailer receiving one or more of the messages from the B2B marketplace;

using the retailer interest model to determine, for each retailer of the two or more of the plurality of retailers, a respective level of interest for each of a plurality of different message types that may be sent by the B2B marketplace;

using a decision engine to schedule and control, for each retailer of the two or more of the plurality of retailers, based on outputs of the communications timing model and the retailer interest model, when and which of the messages are to be sent to the retailer;

providing, for a given one of the retailers, a plurality of message queues each of which has a respective message transmission rate limit;

grouping similar first type of the messages for the given one of the retailers into a same first one of the plurality of message queues, and grouping similar second type of the messages for the given one of the retailers into a same second one of the plurality of message queues;

ranking the messages stored within each of the plurality of message queues for the given one of the retailers by calculating respective ranking scores for the messages stored within each of the plurality of message queues; and for each message queue of the first and the second ones of the plurality of message queues for the given one of the retailers, eliminating one or more of the messages grouped within the message queue that have the lowest ranking scores when there are more messages within the message queue than the respective message transmission rate limit for the message queue;

wherein for the given one of the retailers, the decision engine controls when and which of the messages are sent to the given one of the retailers by selecting one or more messages to be sent from each message queue, of the first and the second ones of the plurality of message queues, that were not eliminated from the message queue for the given one of the retailers.

2. The computer implemented method of claim 1, wherein the communications timing model determines the preferred timing for a given one of the retailers based on when the given one of the retailers opens one or more of the messages sent to the given one of the retailers.

3. The computer implemented method of claim 2, wherein the communications timing model also determines the preferred timing for the given one of the retailers based on whether one or more of the messages opened by the given one of the retailers result in one or more product orders from the given one of the retailers.

4. The computer implemented method of claim 2, wherein the communications timing model also determines the preferred timing for the given one of the retailers based on how many of the one or more messages sent to the given one of the retailers are opened during a given time period by the given one of the retailers and sets a limit on a number of messages that can be sent to the given one of the retailers during the given time period based on how many of the one or more messages are opened by the given one of the retailers during the given time period.

5. The computer implemented method of claim 1, wherein the retailer interest model determines one or more interests of a given one of the retailers by identifying one or more of the types of the messages that are opened by the given one of the retailers and places a respective limit on one or more of the types of messages that can be sent to the given one of the retailers based on the one or more interests of the given one of the retailers.

6. The computer implemented method of claim 5, wherein the different message types include at least two of the following:

business transaction type messages;
product launch type messages;
incentive type of messages;
marketing type of messages; and
strategic type messages targeted to a particular one of the retailers.

7. The computer implemented method of claim 1, further comprising filtering the stored messages in a centrally managed filtering system based on quality checks including:

a retailer quality check determination wherein the stored messages to be sent to a disqualified one of the retailers are filtered out and not sent to the disqualified one of the retailers; and a message quality check determination wherein the stored messages that recommend products that are not of interest to a give one of retailers are filtered out and not sent out to the given one of the retailers.

8. The computer implemented method of claim 1, further comprising filtering the stored messages in a centrally managed filtering system based on timing conflict checks, comprising:

a rescheduling check to filter out the stored messages that do not match a given one of the retailers' preferred timing window and rescheduling the filtered out messages to a time when a send time matches the given one of the given one of the retailers' preferred timing window.

9. The computer implemented method of claim 1, further comprising filtering the stored messages in a centrally managed filtering system based on timing conflict checks, comprising:

a message expiration check to filter out the stored messages that have an expired send out time limitation.

10. A system for controlling sending of messages to retailers that utilizes a business-to-business (B2B) marketplace platform to make product orders, the system comprising:

a data store that stores the messages that are to be scheduled to be sent to the retailers;

one or more processors interfaced with the data store and configured to:

use machine learning to train a communications timing model and to train a retailer interest model based on one or more past messages sent to and received by each retailer of one or more retailers;

use the communications timing model to determine, for each retailer of two or more of the retailers, a preferred timing for receiving one or more of the messages from the B2B marketplace;

use the retailer interest model to determine, for each retailer of the two or more of the retailers, a respective level of interest for each of a plurality of different message types that may be sent by the B2B marketplace; and use a decision engine to schedule and control, for each retailer of two or more of the retailers, based on outputs of the communications timing model and the retailer interest model, when and which of the messages are to be sent to the retailer;

provide, for a given one of the retailers, a plurality of message queues each of which has a respective message transmission rate limit;

group similar first type of the messages for the given one of the retailers into a same first one of the plurality of message queues, and group similar second type of the messages for the given one of the retailers into a same second one of the plurality of message queues;

rank the messages stored within each of the plurality of message queues for the given one of the retailers by calculating respective ranking scores for the messages stored within each of the plurality of message queues; and for each message queue of the first and the second ones of the plurality of message queues for the given one of the retailers, eliminate one or more of the messages grouped within the message queue that have the lowest ranking scores when there are more messages within the message queue than the respective message transmission rate limit for the message queue;

for the given one of the retailers, use the decision engine to control when and which of the messages are sent to the given one of the retailers by selecting one or more messages to be sent from each message queue, of the first and the second ones of the plurality of message queues, that were not eliminated from the message queue for the given one of the retailers.

11. The system of claim 10, wherein the communications timing model determines the preferred timing for a given one of the retailers based on when the given one of the retailers opens one or more previous messages sent to the given one of the retailers and places a limit on a number of messages that can be sent to the given one of the retailers during a given time period based on the number of the one or more previous messages were opened by the given one of the retailers during the time period.

12. The system of claim 10, wherein the retailer interest model determines one or more interests of a given one of retailers by identifying one or more types of previous messages opened by the given one of the retailers and places a respective limit on one or more of the types of messages that can be sent to the given one of the retailers based on one or more interests of the given one of the retailers.

13. The system of claim 12, wherein the different message types include at least two of the following:

business transaction type messages;
product launch type messages;
incentive type of messages;
marketing type of messages; and
strategic type messages targeted to a particular one of the retailers.

14. The system of claim 10, wherein the decision engine is further configured to filter the stored messages in a centrally managed filtering system based on quality checks including:

a retailer quality check determination wherein the stored messages to be sent to a disqualified one of the retailers are filtered out and not sent to the disqualified one of the retailers; and a message quality check determination wherein the stored messages that recommend products that are not of interest to a given one of the retailers are filtered out and not sent out to the given one of the retailers.

15. The system of claim 10, wherein the decision engine is further configured to filter the stored messages in a centrally managed filtering system based on timing conflict checks including:

a rescheduling check to filter out the stored messages that do not match a given one of the retailers' preferred timing window and reschedule the filtered out messages to a time when a send time matches the given one of the retailers' preferred timing window.

16. The system of claim 10, wherein the decision engine is further configured to filter the stored messages in a centrally managed filtering system based on timing conflict checks including:

a message expiration check to filter out the stored messages that have an expired send out time limitation.

* * * * *